March 18, 1924. 1,486,994
E. G. THOMAS
SIGNAL FOR WEIGHING SCALES
Filed Oct. 13, 1917
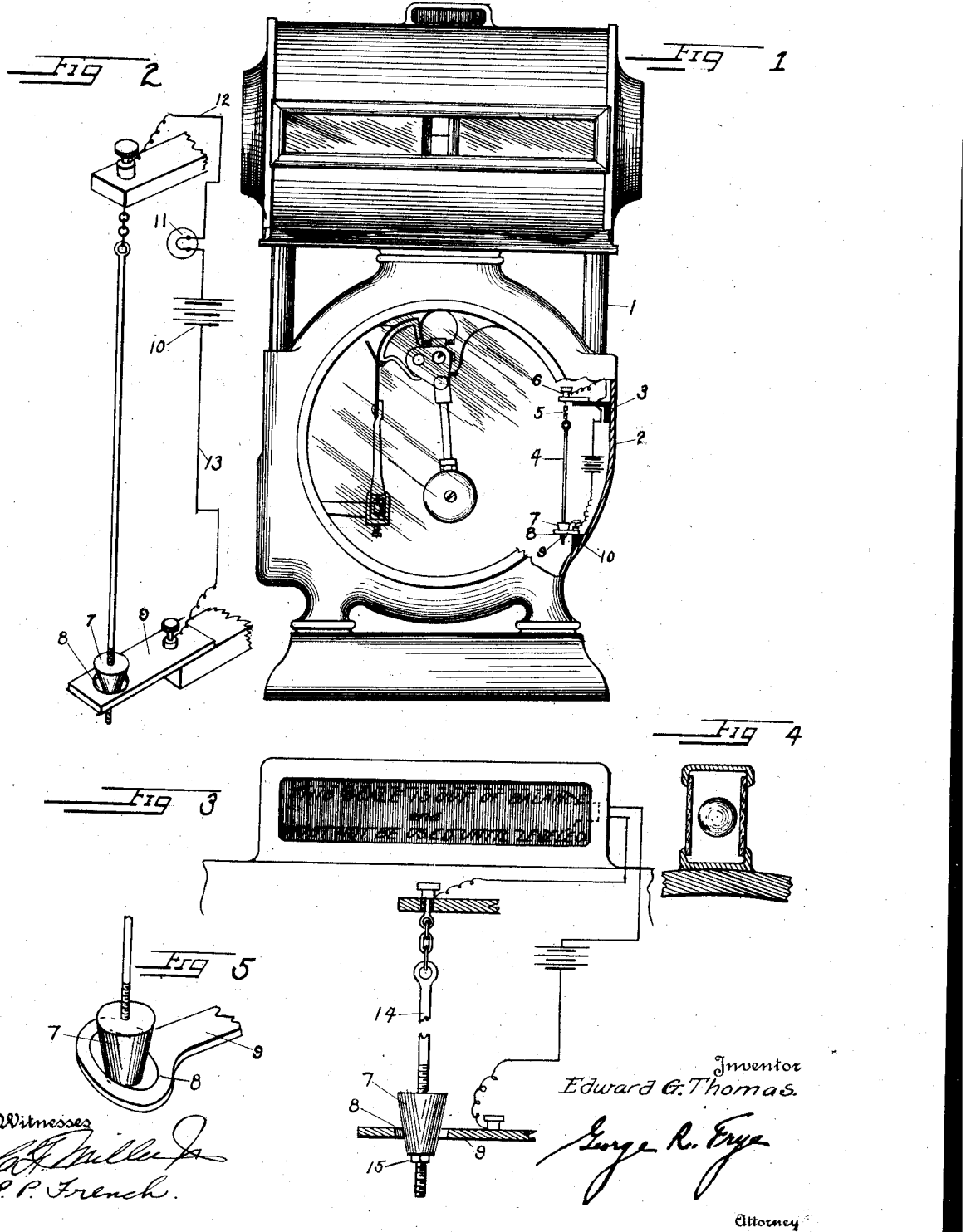
Inventor
Edward G. Thomas.

Patented Mar. 18, 1924.

1,486,994

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

SIGNAL FOR WEIGHING SCALES.

Application filed October 13, 1917. Serial No. 169,514.

*To all whom it may concern:*

Be it known that I, EDWARD G. THOMAS, a citizen of the United States, residing at Toledo, in the county of Lucas and State of Ohio, have invented certain new and useful Improvements in Signals for Weighing Scales, of which the following is a specification.

This invention relates to devices for indicating whether or not a weighing scale is in a level position or beyond a certain degree out of level position in order that there will be pointed out the need for its adjustment should it be beyond an allowable degree out of level.

The majority of States and towns now have ordinances and regulations providing for the degree of accuracy of weighing scales which may be used in the territory covered by such laws and providing for penalties for the use of scales which do not weigh within the tolerances which the regulations provide, the enforcement of these laws being given to a body of inspectors whose duty it is to examine the scales and note whether they act within the prescribed standard. In order not to incur the financial penalties which will arise from the use of inaccurate scales, as well as to give honest weight in their transactions, the users of scales must use all possible precautions to insure the accuracy of their weighing devices. The makers of scales on their part are prepared to furnish to the general public scales which will weigh within very narrow limits of accuracy, but it is requisite that the scales while in use shall be maintained in the position for which they were originally adjusted. Since, however, the position of the scale depends upon the solidity of the counter or table upon which it is placed, it is obvious that the scale may be accidentally thrown out of level by the warping or other change in shape of its support, or by the temporary bending of the counter or table through the depositing upon it of heavy weights of material.

The purpose of my invention is to furnish an indication of an out-of-level position which shall forcibly attract the eye and be located in a prominent position, thus effectively notifying the user of the scale that the scale is not in condition for accurate weighing. Provision may also be made for displaying the indicator to the customer as well as to the user to permit a check on any dealer who might desire to use the scale when not in position for honest weighings.

A further object of this invention is to provide a visual indication adapted to be electrically illuminated when the scale is out of level beyond allowable limits, and to automatically effect this illumination.

With the above objects in view, which will readily appear from the following description, my invention consists of the novel construction, combination and arrangement of parts more fully described in the following specification and set forth in the subjoined claims.

Referring to the drawings, which portray an illustrative form of my invention, and wherein similar reference numerals designate similar parts throughout the several views:—

Fig. 1 is a front elevation of a well known type of scale in which a portion of the casing has been broken away to show some of the parts which enter into my invention;

Fig. 2 is an isometric perspective of the parts entering into the device in skeleton form, showing fully an electrical circuit involved;

Fig. 3 shows the parts entering into the device and, in larger size than in Fig. 1, a visual signal which will be prominently displayed and illuminated when the scale is out of level;

Fig. 4 is a cross section through said visual signal; and

Fig. 5 illustrates a modified form of contact member forming a part of the device.

Referring to the drawings, 1 designates a typical counter weighing scale and in the preferred form shown employes a pendulum as its weight-offsetting device. A bracket 3 mounted on and electrically insulated from the scale casing 2 carries a plumb bob 4 suspended by a chain 5 so as to be capable of free movement in all vertical planes. The chain 5 is preferably suspended from an adjusting screw 6 in a member attached to bracket 3 so that the plumb bob is capable of vertical adjustment. As shown, the weight 7 of the plumb bob 4 is conical in form and so located as to occupy a position within an opening 8 in a metal plate 9 mounted upon an insulating block 10, which in turn is secured to and supported by the casing 2 of the scale. The opening 8 in plate 9 is larger in diameter than weight 7 of the plumb bob at the point where it passes through the metal plate 9 and the parts of the device are so located in reference to casing 2 that when the scale is in a level position in all directions weight 7 will hang in the center of opening 8 so as not to contact at any point with the periphery of the opening. An electrical circuit consisting of a battery 10, a lamp or lamps 11, wires 12 and 13 in contact respectively with the point of support of the plumb bob 4 and metal plate 9 is provided. The plumb bob 4 is made of conducting material, and the circuit through the battery 10 and lamps 11 will be closed should the plumb bob come into contact with metal plate 9. Inasmuch as the plumb bob 4 will at all times occupy a vertical position, it is obvious that such contact between weight 7 and the sides of opening 8 in plate 9 can occur only when a change in the position of the scale occurs whereby in one direction or another its level is disturbed, and the illumination of lamp 11 will be an indication of this disturbance of level.

Inasmuch as a minute change of level in the position of the scale may not result in an error in its weighing sufficiently great to cause it to exceed the tolerance permitted, the difference in the diameter of opening 8 and weight 7 is so designed as to cause the circuit to be closed only after a change of level sufficient to cause the error in weighing due to it to approach or exceed the permitted tolerance. In order that the device may be adjusted to produce the desired relation between the time of lighting the signal and the permitted error in the weighing of the scale, the weight 7 is made conical and means are provided for raising or lowering it so that different diameters of the weight may occupy the plane of plate 9. In Fig. 1 this may be accomplished by turning an adjusting screw 6, while in Fig. 3 the rod 14 of plumb bob 4 is threaded and the weight 7 may be raised or lowered by means of a nut 15 screwed upon rod 14. If the weight 7 is lowered, the circuit will be closed with a smaller change in position of the scale than when the weight 7 is raised.

In Figs. 1, 3 and 4 a very prominent signal is illustrated, consisting of a plate of glass or other transparent material upon the back of which is printed some warning or instructive phrase, as "This scale is out of balance and must not be used until leveled," the glass plate being ground upon one surface or otherwise so made that the letters upon the back are not normally visible. In the back of the glass is located the lamp or lamps 11 of the circuit previously described, and when this lamp is lighted the lettering upon the glass will be very plainly visible in contrast with the brilliantly lighted glass. If it should be desirable to give a similar indication on the customer's side of the scale as well as the user's side, a similar plate of glass suitably lettered may be placed on each side of lamp 11 to be illuminated by it when the circuit is closed, and such an arrangement of these visual signals is illustrated sectionally in Fig. 4.

A change of level in one direction may not cause the same error in the weighing as will a change of level of the same amount in a direction at right angles to the first change, and in general with pendulum scales a change of level in the plane in which the pendulum swings will cause a greater error than the same change of level at right angles thereto. For this reason it is desirable to permit a greater relative motion between weight 7 and plate 9 before contact is established between them in a direction at right angles to the plane in which the pendulum of the scale swings. This can be accomplished readily by making the opening in plate 9 elongated with its shortest dimension parallel to the plane of the pendulum's swing, as illustrated in Fig. 5.

While it will be apparent that the illustrated embodiment of my invention herein disclosed is well calculated to adequately fulfill the objects primarily stated, it is to be understood that my invention is susceptible to variation, modification and change without departing from the spirit and scope of the invention as set forth in the subjoined claims.

Having described my invention, I claim:

1. In a device of the class described, in combination a frame, a weighted member pivotally supported thereby and having a contact member of circular section, a contact plate having an opening greater in one dimension than at right angles thereto and in which said contact member is located, an indicating device, and electrical means for operating said device when contact is established between said contact member and said contact plate.

2. In a device of the class described, in combination a frame, a vertically-adjustable frusto-conical contact member suspended therefrom, a contact plate having an oval opening of greater diameter than that of said contact member loosely surrounding said contact member, an indicating device, and an electric circuit for operating said indicating device and including said contact member and said contact plate.

3. In a device of the class described, in combination a frame, a plate having a non-circular opening, a circular contact member of lesser horizontal dimensions than said opening and surrounded thereby, said member and plate being relatively movable upon tilting said frame, and an electric signal actated by engagement of said contact member and said plate.

EDWARD G. THOMAS.

Witnesses:
F. A. CROWLEY,
GEORGE R. FRYE.